(12) United States Patent
Kane et al.

(10) Patent No.: US 6,614,815 B1
(45) Date of Patent: Sep. 2, 2003

(54) BLUE LASER BASED ON INTERACTIONS IN FIBER

(75) Inventors: Thomas J. Kane, Menlo Park, CA (US); Gregory L. Keaton, San Francisco, CA (US)

(73) Assignee: Lightwave Electronics, Mountain View, CA (US)

( * ) Notice: Subject to any disclaimer, the term of this patent is extended or adjusted under 35 U.S.C. 154(b) by 259 days.

(21) Appl. No.: 09/608,442

(22) Filed: Jun. 29, 2000

(51) Int. Cl.[7] .............................. H01S 3/30; H04B 10/12
(52) U.S. Cl. ............................... 372/6; 372/22; 372/70; 359/328; 359/341.1; 359/345
(58) Field of Search ......................... 372/6.22, 70, 75, 372/102; 359/326, 328, 333, 340, 345, 341.1

(56) References Cited

U.S. PATENT DOCUMENTS

| | | | |
|---|---|---|---|
| 4,764,933 A | * 8/1988 | Kozlovsky et al. | 372/40 |
| 5,056,888 A | 10/1991 | Messerly et al. | 385/123 |
| 5,388,113 A | 2/1995 | Oka | 372/21 |
| 5,651,019 A | 7/1997 | Goldberg et al. | 372/68 |
| 5,659,558 A | 8/1997 | Tohmon et al. | 372/5 |
| 5,745,284 A | 4/1998 | Goldberg et al. | 359/344 |
| 5,774,484 A | 6/1998 | Wyatt et al. | 372/6 |
| 5,818,630 A | * 10/1998 | Fermann et al. | 359/341 |
| 5,867,305 A | 2/1999 | Waarts et al. | 359/341 |
| 5,880,877 A | * 3/1999 | Fermann et al. | 359/341 |
| 5,892,615 A | 4/1999 | Grubb et al. | 359/341 |
| 5,909,306 A | 6/1999 | Goldberg et al. | 359/341 |
| 5,912,910 A | 6/1999 | Sanders et al. | 372/22 |
| 5,930,030 A | 7/1999 | Scifres et al. | 359/341 |
| 5,933,271 A | 8/1999 | Waarts et al. | 359/341 |
| 5,966,391 A | 10/1999 | Zediker et al. | 372/22 |
| 5,974,059 A | 10/1999 | Dawson | 372/6 |
| 5,999,548 A | * 12/1999 | Mori et al. | 372/22 |
| 6,009,114 A | 12/1999 | Heller et al. | 372/75 |
| 6,021,141 A | * 2/2000 | Nam et al. | 372/20 |
| 6,154,321 A | * 11/2000 | Melville et al. | 359/630 |
| 6,181,465 B1 | * 1/2001 | Grubb et al. | 359/337 |
| 6,212,310 B1 | * 4/2001 | Waarts et al. | 385/24 |
| 6,278,816 B1 | * 8/2001 | Keur et al. | 385/29 |
| 6,301,271 B1 | * 10/2001 | Sanders et al. | 372/3 |
| 6,307,994 B1 | * 10/2001 | Paek et al. | 385/127 |

OTHER PUBLICATIONS

"Bending loss of propagation modes in arbitrary—index profile optical fibers", Jun–Ichi Sakai and Tatsuya Kimura, May 15, 1978/vol. 17, No. 10/Applied Optics, 1499.

"Bend behavior of polarising optical fibers", Electronics Letters, Aug. 18, 1983, vol. 19, No.17, 679.

"Propagation in doubly clad single–mode fibers", IEEE Journal of Quantum Electronics, vol. QE–18, No. 4, Apr. 1982, 535.

* cited by examiner

*Primary Examiner*—Paul Ip
*Assistant Examiner*—Davienne Monbleau
(74) *Attorney, Agent, or Firm*—Lumen Intellectual Property Services, Inc.

(57) ABSTRACT

An approach to blue light in a single, integrated system is disclosed. An oscillator generates source radiation at a wavelength near 0.91 microns and a few milliwatts of power. This power is amplified to multi-Watt levels in a Neodymium-doped cladding-pumped fiber device that has its gain suppressed at 1.05 microns. A harmonic generator frequency-doubles the output of the fiber device to produce radiation at a blue wavelength near 0.455 microns. Mirrors, gratings or other means in the fiber expel wavelengths of light at or near 1.05 microns while allowing 0.91 micron radiation to remain in the fiber. Gain at 1.05 microns may alternatively be suppressed by adjusting the refractive index profile of the fiber to eliminate bound-modes at 1.05 microns or by bending the fiber to attenuate radiation at 1.05 microns. The laser may include a high brightness pump to enhance the transition that produces 0.91 micron radiation. Short-pulse, high-peak power-oscillators may be used to facilitate operation of the harmonic generator. The blue light source may be incorporated into a three-color projection or image display system.

14 Claims, 9 Drawing Sheets

US 6,614,815 B1

BLUE LASER BASED ON INTERACTIONS IN FIBER

FIELD OF THE INVENTION

This invention relates generally to nonlinear optics. More particularly, it relates to generation of blue light for three-color laser light sources.

BACKGROUND ART

Color display systems often rely on three separate sources to produce three primary colors of light. The intensities of the three primary colors can then be varied and mixed to produce various different colors in a color image. The eye's perception of color is related to the response of three different types of cells in the retina. Each type of cell responds to a different portion of the electromagnetic spectrum.

For the specific purpose of display or projection systems the best wavelength for "blue" light is about 450 nm (in vacuum). Such light is actually perceived by the human eye as a purplish-blue color as opposed to a pure blue. "Pure" blue light is typically characterized by a wavelength in the range of about 460 nm to about 480 nm. The reason for using 450 nm can be explained using the chromaticity diagram of FIG. 1. Given three colors that can be located on the chromaticity diagram, it is only possible to create by addition colors which are on the interior of a triangle created by placing corner points at the three colors. It is clear from FIG. 1 that a wavelength of 450 nm is ideal. A display system based on a wavelength of 470 nm would create a situation where a number of well saturated purples and red-purples are outside the triangle and, thus, not accessible to the display system.

A single laser which has output at the three colors of red, green and blue would be valuable for projection displays. Development of such lasers has been hampered by difficulties in producing blue light at sufficient power levels for use in a display. One current approach to generating high power levels of blue light is to use Nd:YAG lasers operating at 1064 nm. The output of the laser is frequency doubled with a nonlinear crystal to 532 nm. The frequency-doubled output then pumps an OPO. One of the OPO output wavelengths is then summed with the 532-nm light to create the blue. Thus 2 nonlinear steps in 2 separate crystals are required to produce blue light from infrared laser light. Since each step requires crystals, and has limited efficiency, the overall system is expensive and inefficient. Furthermore, Nd:YAG lasers require water-cooling and resonator structures, which add to the complexity, bulk and cost of the system.

There is a need, therefore, for a compact, efficient and inexpensive blue lasers for red/green/blue displays.

OBJECTS AND ADVANTAGES

Accordingly, it is a primary object of the present invention to provide a blue light source for projection displays. It is a further object of the invention to provide a blue laser that uses fewer and less-critically aligned components than previous systems. It is an additional object of the invention to provide a blue light source that uses only a single crystal.

SUMMARY

These objects and advantages are attained by an apparatus and method for producing blue light and a fiber device having means for suppressing gain at an undesired wavelength. The apparatus generally comprises a light-generating fiber device optically coupled to an optical harmonic generator. The fiber device produces radiation at a power level sufficient to operate the optical harmonic generator. The optical harmonic generator increases a frequency of the radiation to produce a blue output radiation. The fiber device may be an oscillator or an amplifier, such as a Neodymium-doped cladding-pumped fiber amplifier. The fiber device may be pumped by a high intensity pump source to enhance the gain of radiation having a harmonic that is blue. For acceptable efficiency using the short-wavelength transition of Nd:glass fibers the pump power preferably remains above 50 Watts/mm$^2$ along substantially the entire length of the fiber. The power of pumping radiation is preferably greater than about 100 Watts/mm$^2$ and more preferably, about 500 Watts/mm$^2$ or greater at a fiber entrance depending on the pumping configuration.

If the fiber device is a fiber amplifier, an oscillator may be optionally coupled to the fiber amplifier. The oscillator produces source radiation. The fiber amplifier amplifies the radiation produced by the oscillator. Suitable oscillators include mode locked lasers based on transitions in Nd:Glass, Nd:Vanadate, Nd:YLF, and other Nd materials and pulsed semiconductor lasers.

The fiber device typically produces infrared radiation having a frequency with a harmonic that falls in the blue portion of the visible spectrum. The optical harmonic generator generates blue light from the infrared light, by a non-linear harmonic generation process. The fiber device may include means to suppress gain of radiation having harmonics that are not blue. Such means include dopants, fiber gratings, and dichroic mirrors. In a specific embodiment, the gain suppression means suppresses gain at 1.05 $\mu$m without suppressing gain at 0.91 $\mu$m.

A first alternative means for optical gain suppression includes a fiber having a core surrounded by a cladding with a tunnel cladding disposed between the cladding and the core. Light of an undesired wavelength tunnels out of the core along the length of the fiber. The fiber thus has no bound modes at the undesired wavelength. A second alternative means for optical gain suppression includes a fiber that has been bent to a bend radius such that wavelength dependent losses caused by the bending attenuate radiation of the undesired wavelength.

The fiber device and blue laser apparatus find application as light sources for three-color light displays. Light sources based on the embodiments of the present invention are capable of producing blue light at an output power of order 1 watt or more.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In the discussion that follows, the word "a" may be taken to mean "one or more," unless specifically stated otherwise. For the purposes of the following discussion, "blue light" generally refers to electromagnetic radiation having a frequency of between about $6.7 \times 10^{14}$ Hz and $6.3 \times 10^{14}$ Hz (about 430 to 480 nm wavelength in vacuum). "Green light" refers to radiation having a frequency of between about $5.9 \times 10^{14}$ Hz and $5.5 \times 10^{14}$ Hz (about 510 to 550 nm wavelength in vacuum). "Red light" refers to radiation having a frequency of between about $4.8 \times 10^{14}$ Hz and $4.2 \times 10^{14}$ Hz (about 620 to 720 nm wavelength in vacuum).

1. Blue Laser

Figure 1:
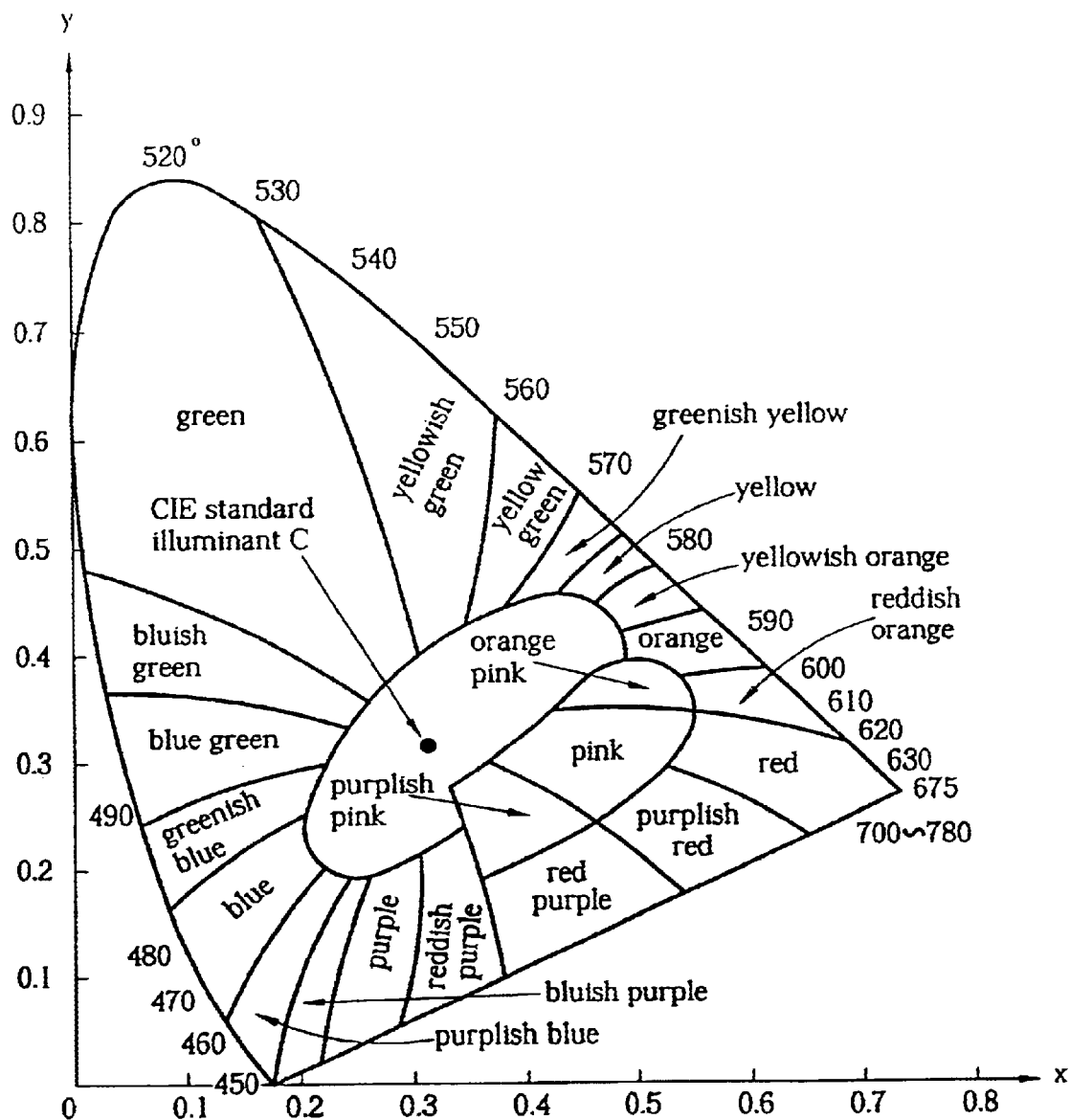
FIG. 1 depicts a chromaticity diagram, depicting color location.
Figure 2A:
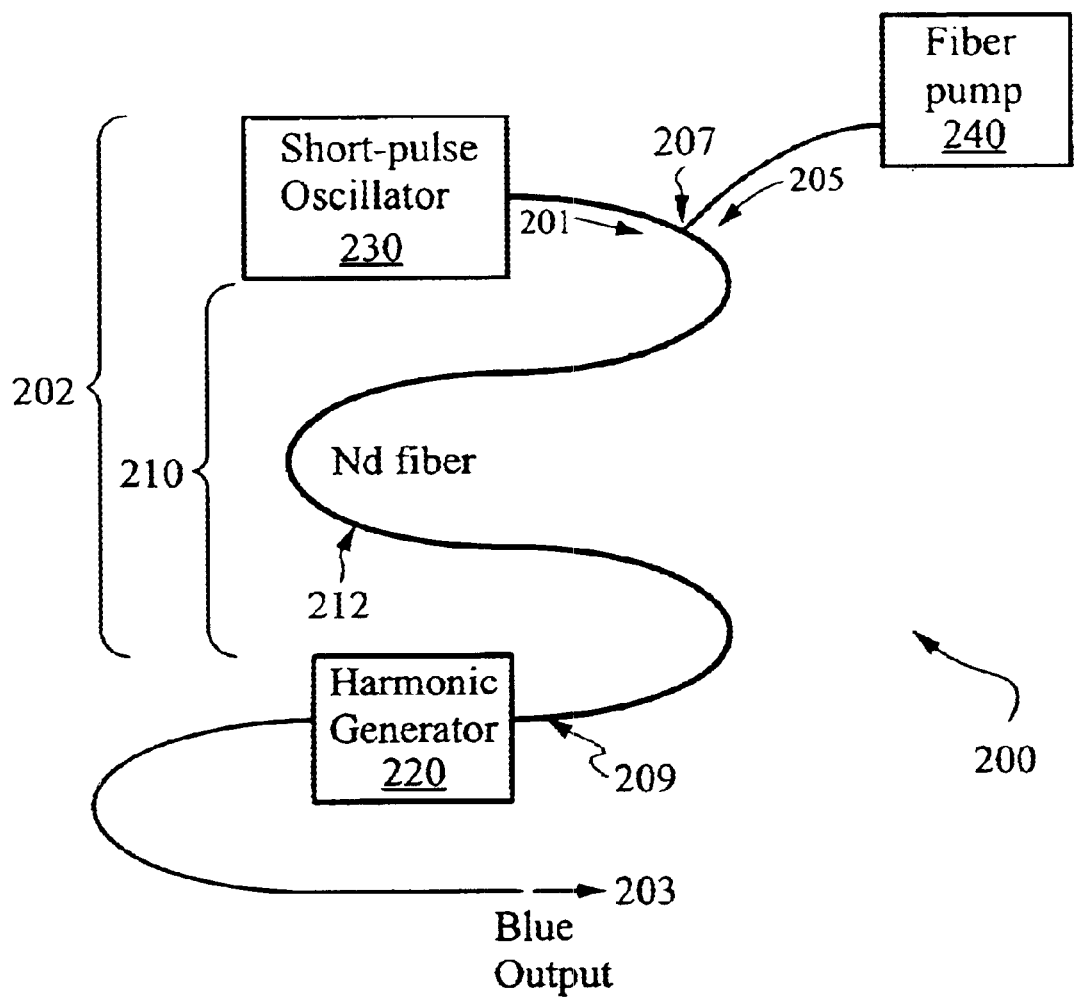
FIG. 2A depicts a simplified schematic diagram of a blue laser according to a first embodiment of the present invention.

FIG. 2A depicts a simplified schematic diagram of a blue laser apparatus according to a first embodiment of the present invention. The laser 200 generally comprises a Neodymium-doped cladding-pumped light-generating fiber device 202 optically coupled to a harmonic generator 220. The fiber device 202 may include a fiber oscillator, a fiber amplifier or both. The harmonic generator 220 generates a second or higher order harmonic of a source radiation 201 from the fiber device 202. The generated second or higher order harmonic of the source radiation 201 is characterized by a wavelength in vacuum corresponding to the color blue and referred to as blue output radiation 203.

In a specific embodiment, the fiber device 202 comprises a fiber amplifier 210. The fiber amplifier 210 receives optical power in the form of source radiation 201 from an oscillator 230. The fiber amplifier 210 amplifies the optical power from the oscillator 230 to a level on the order of 1 watt or greater. The harmonic generator 220 may, for example, be a second-harmonic generator that doubles the frequency of the output of the amplifier 210 to produce blue output radiation 203. For projection or display applications, the blue radiation is preferably characterized by a wavelength in vacuum of between about 440 nm and about 460 nm. For example, a fiber amplifier 210 doped with Neodymium will preferentially amplify radiation at a half harmonic of blue (0.91÷2=0.455 microns). Alternatively, harmonic generator 220 may generate higher order harmonics of the source radiation 201 such as third-harmonics, etc. to produce blue radiation.

Figure 2B:
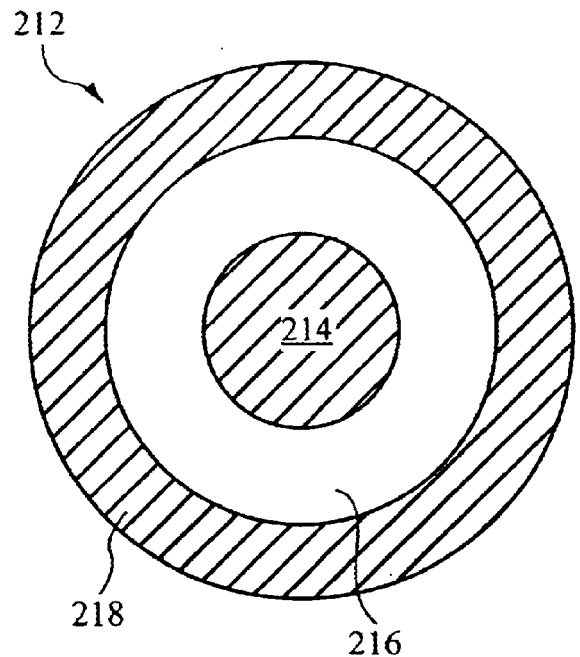
FIG. 2B depicts cross sectional schematic diagram of a fiber used in the laser of FIG. 2A.
Figure 2B:
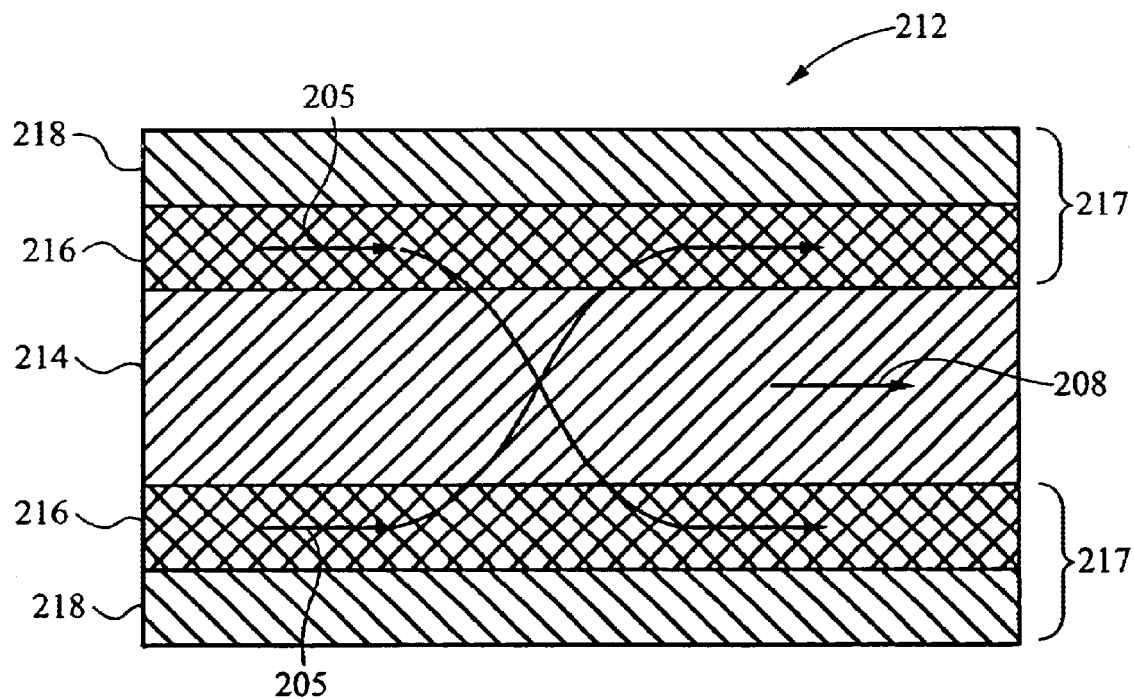

The fiber amplifier 210 generally comprises an optical fiber 212 having a core 214 made of Neodymium doped glass. FIG. 2B depicts cross sectional schematic diagrams of the optical fiber 212. The fiber 212 generally comprises the core 214 surrounded by a cladding 217 including inner and outer cladding layers 216 and 218 respectively. The cladding layer 216 is optically coupled to a pump source 240. The pump source 240 may comprise one or more high-power pump diodes, for example, at a wavelength near 0.80 microns. Because of the three-level nature of the transition in Nd:Glass, the pump source 240 preferably produces pumping radiation 205 having an intensity that is a substantial fraction of a saturation intensity of the pumped transition, e.g. about 500 Watts/mm$^2$. Such a pump source 240 is generally referred to herein as a high-brightness pump source.

To amplify the source radiation 201, technique commonly referred to as "cladding pumping" may be used. In a cladding pump technique, core 214 is preferably a single-mode core surrounding by a multi-mode inner cladding layer 216 which, turn, is surrounded by outer cladding layer 218. The core 214 is typically doped with Nwodymium (Nd). A relatively high-power multimode pumping radiation signal 205 launched into the cladding 217 from the pump source is substantially confined and guided within the multi-mode cladding layer. Pumping radiation 205 propagates along the multi-mode inner cladding layer 216 criss-crossing the core 214. The Nd doped core 214 absorbs energy from the pumping radiation 205. The absorbed energy is converted into laser output radiation 208 within the core.

Neodymium glass is known to have gain at a wavelength of 0.91 microns, but its gain at 1.05 microns is higher. A similar situation exists in Nd:YAG laser crystals, where gain is higher at 1.06 microns than at 0.946 microns. It is desirable to suppress the gain at 1.05 and 1.06 microns because the second harmonics of 1.05-micron and 1.06-micron radiation, i.e. 525-nm and 530-nm radiation respectively, are not blue. Gain-suppression means at wavelengths having second harmonics that are not blue may be necessary, to keep parasitic oscillation at these wavelengths from extracting all the power from the amplifier 210.

In view of the above, two conditions are desirable for efficient operation using the short-wavelength, e.g. 0.91 micron transition of Nd:glass. A first condition is for fiber 212 to have a distributed loss means that attenuates the 1.05 micron radiation from the high gain, undesired, long-wavelength transition much more than they attenuate the radiation from the desired, short wavelength transition. A second condition is that the intensity of the pumping radiation 205 at a wavelength near 800 nm be relatively high. For acceptable efficiency using the short-wavelength transition of Nd:glass fibers the pump intensity preferably remains above 50 Watts/mm$^2$ along substantially the entire length of the fiber. Since the power in the fiber is absorbed exponentially, and typically absorption near 90% is desired for good efficiency, the power of pumping radiation is preferably about 500 Watts/mm$^2$ or greater at a fiber entrance 207 if the pump radiation 205 passes once through the fiber 212. The minimum required pump intensity may be reduced to about 250 Watts/mm$^2$ if the pump radiation 205 exiting at a far end 209 of the fiber 212 is retroreflected so that it returns to the fiber 212. The intensity of pump radiation 205 may also be reduced if, for example, identical pumps are used at both ends of the fiber 212. Generally, the pump sources e.g. pump source 240, produce sufficient pump power that pump radiation 205 has an intensity of 50 Watts/mm$^2$ or greater inside the fiber 212 and an intensity greater than or equal to 100 Watts/mm$^2$ at the entrance to the fiber 212.

Pumping intensities at levels greater than or equal to about 100 Watts/mm² have only recently become available. One pump source commonly used for diode pumping is an SDL-3460-P6 diode from SDL of San Jose, Calif. This pump source provides 16 Watts of power from a 0.6 mm diameter aperture. The pump intensity, i.e. the power divided by the aperture area is equal to about 57 Watts/mm². This is generally inadequate for pumping the short wavelength transition of Nd:glass fiber, even with double ended pumping and suppression of the 1.05 micron transition. A newer design of fiber pump is available from LIMO of Dortmund, Germany. This diode source has a power of about 25 Watts from a 0.2 mm diameter fiber. The corresponding intensity is about 795 Watts/mm². This is more than adequate to pump the short-wavelength transition of Nd:glass, even with single-ended pumping.

In lasers using the short wavelength transition of Nd:Glass (e.g. 910 nm) there is a tradeoff between wavelength and pump intensity. In a 3-level transition with a significant wavelength breadth, such as the short wavelength transition of Nd:.lass, shorter wavelengths require a more intense pump source to achieve gain because a greater fraction of the atoms must be inverted to achieve gain. At very low pump intensities, e.g. 50 Watts/mm² or less, gain is possible only at wavelengths longer than 920 nm. Achieving gain in the range. between 900 nm and 920 nm typically requires pumping intensities of about 100 Watts/mm² or more. Even shorter wavelengths can be obtained with still higher pump intensities.

As stated above, it is often useful and sometimes necessary to suppress the gain of an undesired long wavelength transition in a fiber device. One way to suppress gain at undesired wavelengths is through dopants disposed in the cladding 217. For example The cladding 217 may include dopants that absorb radiation emitted by a $^4F_{3/2}$ to $^4I_{11/2}$ atomic transition corresponding to a wavelength in vacuum of 1.05 microns for Neodymium glass and 1.06 microns for Nd:YAG. Preferably, the dopants are also transparent to radiation emitted by a $^4F_{3/2}$ to $^4I_{9/2}$ atomic transition corresponding to 0.91 microns in Neodymium glass and 0.946 microns in Nd:YAG. Such dopants include ions such as $Yb^{3+}$, $Dy^{3+}$, $Pr^{3+}$, $Tm^{2+}$ and $Sm^{3+}$ and $V^{3+}$.

Figure 2C:
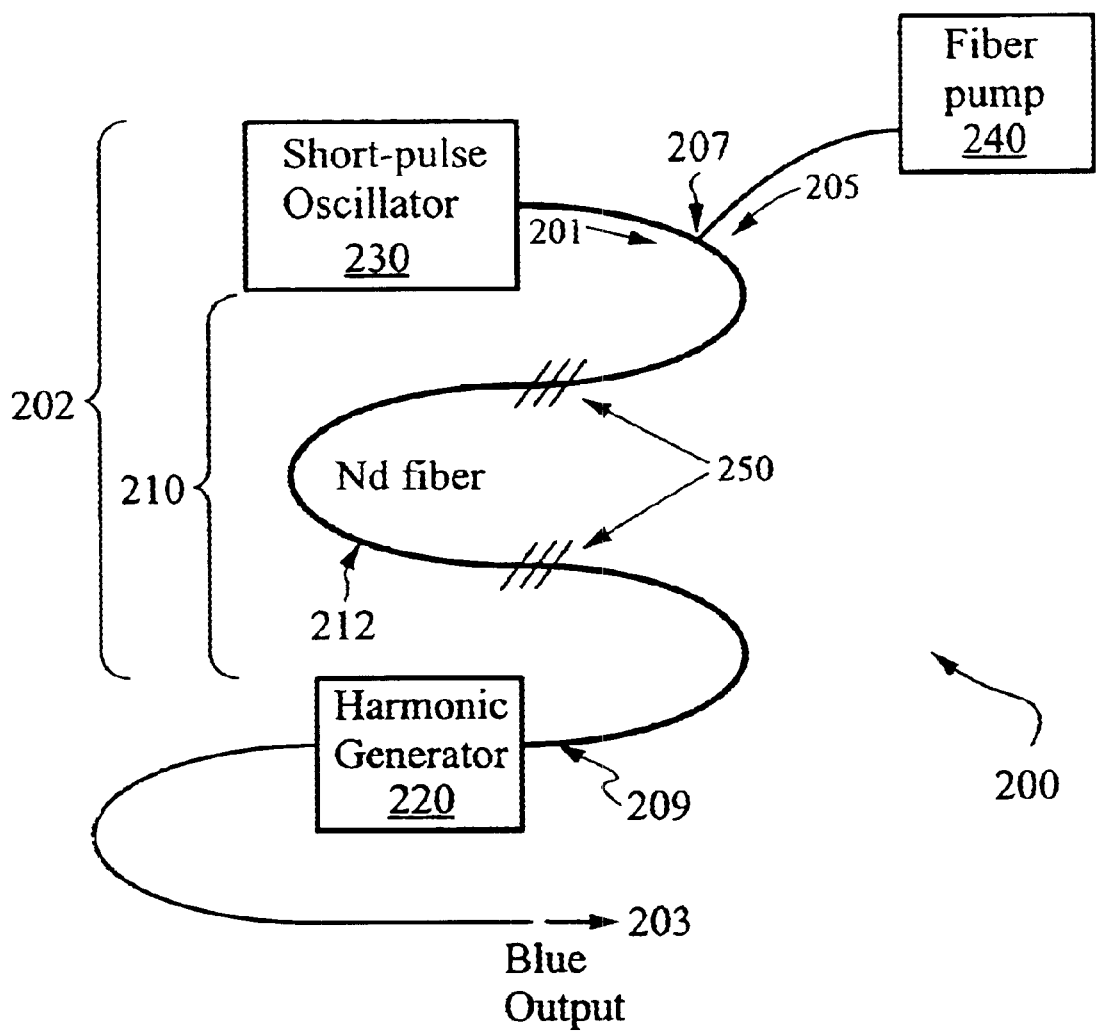
FIG. 2C depicts a simplified schematic diagram of a blue laser according to an alternative embodiment of the present invention.
Figure 2D:
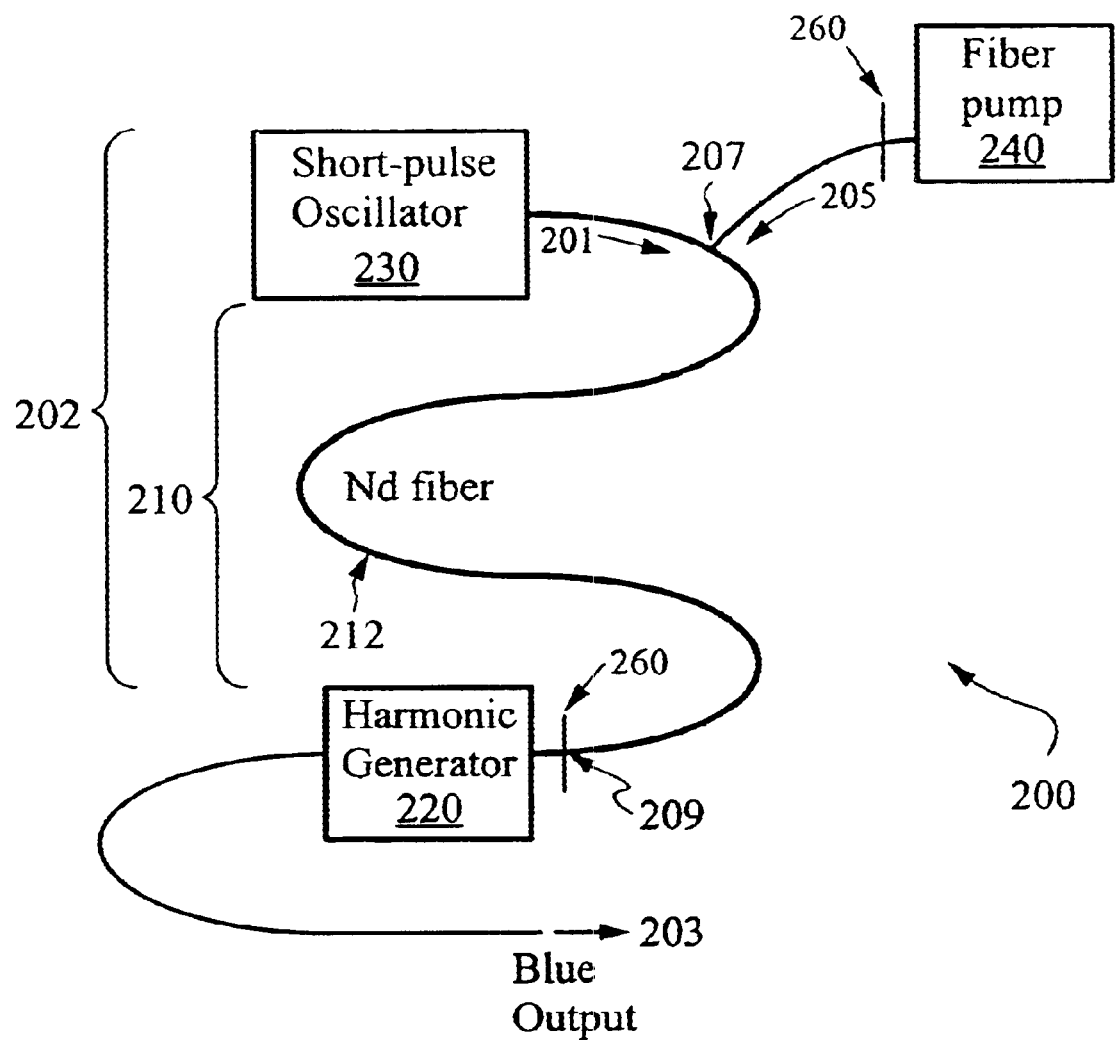
FIG. 2D depicts a simplified schematic diagram of a blue laser according to an alternative embodiment of the present invention.

Alternatively, as respectively shown in FIGS. 2C–2D, gain at undesired wavelengths may be suppressed by means of gratings or mirrors. For example, fiber 212 may have an index of refraction n that varies periodically along its length to form gratings 250. By suitably varying the index of the fiber 212 the gratings can reflect certain wavelengths of light out of the fiber while transmitting others. In fiber gratings maxima in n are typically separated by a distance of approximately one-half the wavelength of undesired light in the fiber. The gratings are usually aligned at a non-normal incidence with respect to the fiber axis. Such gratings reject the undesired wavelengths from the core 214 of fiber 212. Fiber 212 may also include dichroic mirrors 260 coupled to the ends of the fibers. The mirrors transmit wavelengths in an undesired range, e.g. 1.05 microns, while reflecting other wavelengths, e.g. 0.91 microns back into the fiber.

Figure 3A:
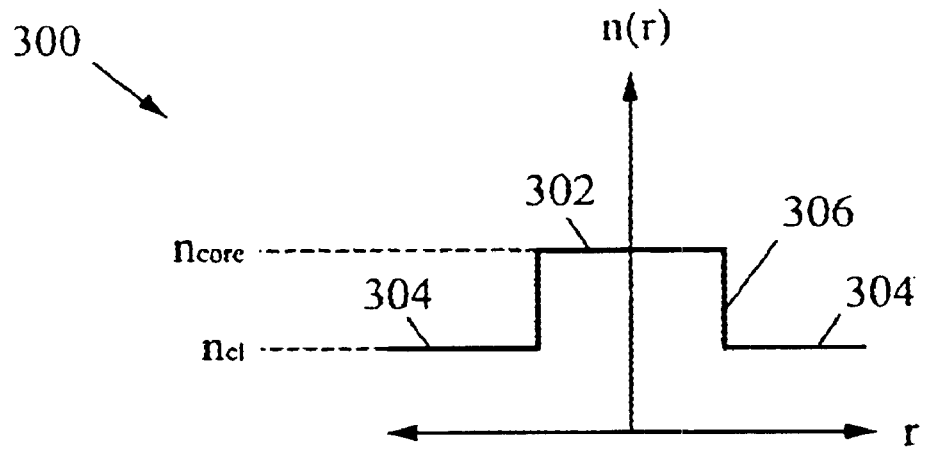
FIG. 3A depicts a refractive index profile of a conventional fiber.
Figure 3B:
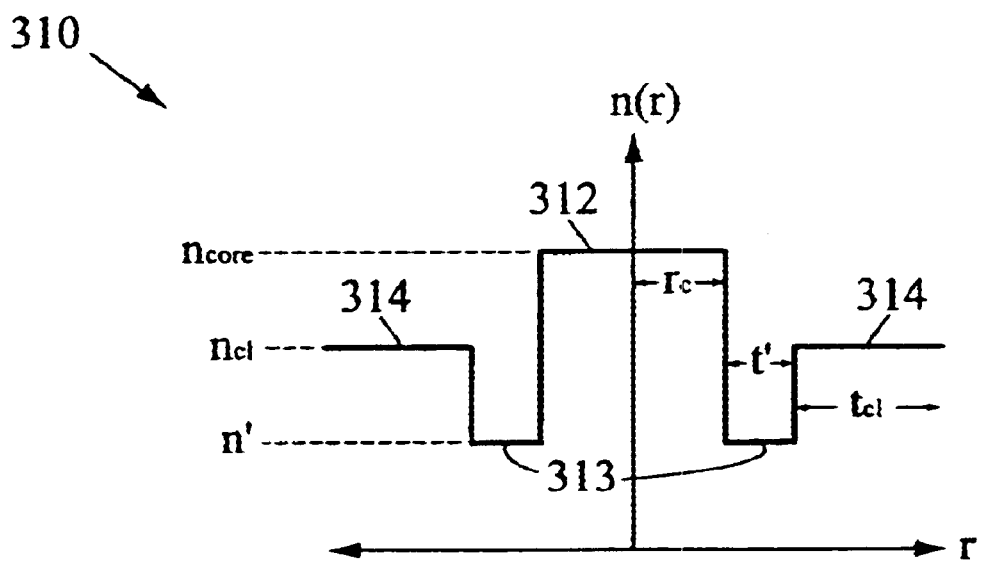
FIGS. 3B–3C depict refractive index profiles for rejecting undesired wavelengths from the core of a fiber according to an embodiment of the present invention.
Figure 3C:
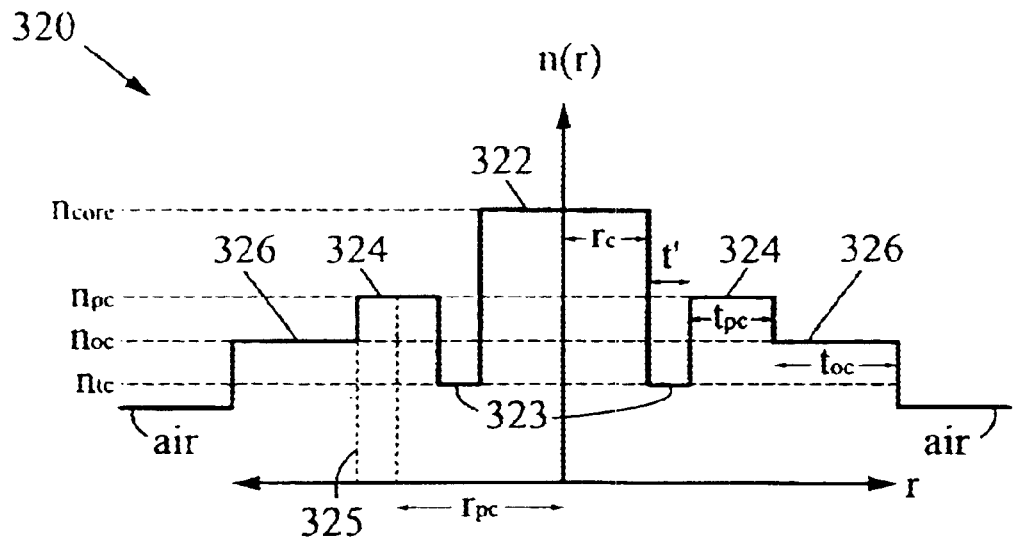

A first alternative method for suppressing undesired wavelengths is depicted in FIGS. 3A–3C. The alternative method for suppressing the undesired wavelength is based on the observation that a typical fiber core surrounded by a cladding always has at least one bound mode at any wavelength. FIG. 3A depicts a graph 300 of refractive index n versus radial distance r from the center of a typical optical fiber. The core region 302 typically has a higher refractive index than the cladding region 304. Total internal reflection takes place at the interface 306 between the core region 302 and the cladding region 304. However, if the a narrow region of lower refractive index than the cladding region 304 surrounds the core region 302 light may tunnel out of the core region 302. It is possible in such a situation that light at certain wavelengths will have no bound modes. The situation is depicted schematically in the graph 310 of FIG. 3B. In FIG. 3B, a fiber has a core region 312 surrounded by a tunnel cladding region 313. A cladding region 314 surrounds the tunnel cladding 313 and core regions 312. The core is characterized by a refractive index $n_{core}$ and a radius $r_c$. The cladding region 314 is characterized by a refractive index $n_{c1}$ and a thickness $t_{c1}$. The tunnel cladding region 313 is characterized by a refractive index n' and a thickness t'. Generally, $n' < n_{c1} < n_{core}$. Such a refractive index profile is sometimes referred to as a "W" profile. The propagation of radiation in fibers having such profiles is described in detail by Michael Monerie in "Propagation in Doubly Clad Single-Mode Fibers", IEEE Journal of Quantum Electronics QE-18 (1982) p. 525, which is incorporated herein by reference, and references therein. If the values of $n_{core}$, $n_{c1}$, n', $r_c$, $t_{c1}$ and t' are chosen such that an average squared index of refraction $<n^2(r)> < n_{c1}^2$, then there exists a cutoff wavelength $\lambda_c$ for which light having wavelengths (in vacuum) greater than $\lambda_c$ will have no bound modes. Undesired wavelengths above $\lambda_c$ will be scattered out of the fiber along its length while bound modes of desirable wavelengths below $\lambda_c$ are retained in the fiber. Generally the tunnel cladding region 313 is thick enough that $<n^2(r)> < n_{c1}^2$ but thin enough to provide efficient tunneling of the undesired wavelengths. Thus, by properly engineering the refractive index profile of a fiber, it is possible to have a "W" profile wherein 0.91 $\mu$m $< \lambda_c <$ 1.05 $\mu$m. For such a fiber, light of wavelength 1.05 $\mu$m will not have a bound mode and will pass out of the fiber along its length. Light of wavelength 0.91 $\mu$m will have a bound mode that will be contained by the fiber. The overall effect is to reject the undesired 1.05 $\mu$m radiation while retaining the desired 0.91 $\mu$m radiation.

Figure 3D:
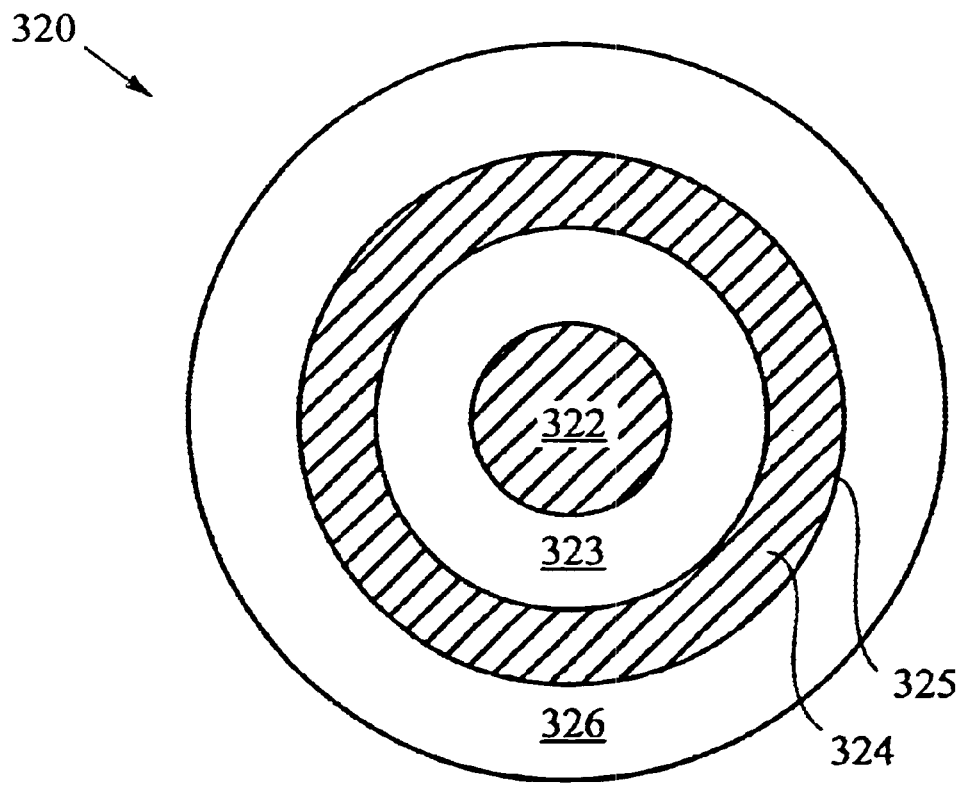
FIG. 3D depicts a simplified schematic diagram of a blue laser having a refractive index profile of FIG. 3C.

A specific embodiment of a practical application of this principle utilizes a triply clad fiber illustrated by the refractive index profile 320 of FIG. 3C. The fiber generally comprises, as shown in FIGS. 3C and 3D, a core region 322 surrounded by a tunnel cladding region 323. A pump cladding region 324 surrounds the core 322 and tunnel cladding 323 regions. An outer cladding region 326 surrounds the core 322, tunnel cladding 323, and pump cladding 324 regions. The core is characterized by a refractive index $n_{core}$ and a radius $r_c$. The tunnel cladding region 323 is characterized by a refractive index n' and a thickness t'. The pump cladding region 324 is characterized by a refractive index $n_{pc}$ and a thickness $t_{pc}$. The outer cladding is characterized by an index of refraction $n_{oc}$ and a thickness $t_{oc}$. The outer cladding may be surrounded by air having an index of refraction of about 1.0. Generally, $n' < n_{pc} < n_{core}$ and $n_{oc} < n_{pc}$. Such a configuration allows the undesired radiation to tunnel out of the core region 322. Total internal reflection at an interface 325 between the pump cladding 324 and outer cladding 326 provides a bound mode that confines the pumping radiation for efficient pumping of the core region 322.

Here, $<n^2(r)>$ is defined as:

$$\langle n^2(r) \rangle = \frac{1}{A} \int_0^{r_{pc}} r dr d\theta n^2(r)$$

where $r_{pc}$ represents some distance from the axis of the fiber that lies within the pump cladding and A represents a cross sectional area of the fiber within $r_{pc}$ of the axis. For example, if the fiber has a circular cross section, $A=\Pi r_{pc}^2$. The radius $r_{pc}$ is typically greater than a few undesired wavelengths.

Figure 4A:
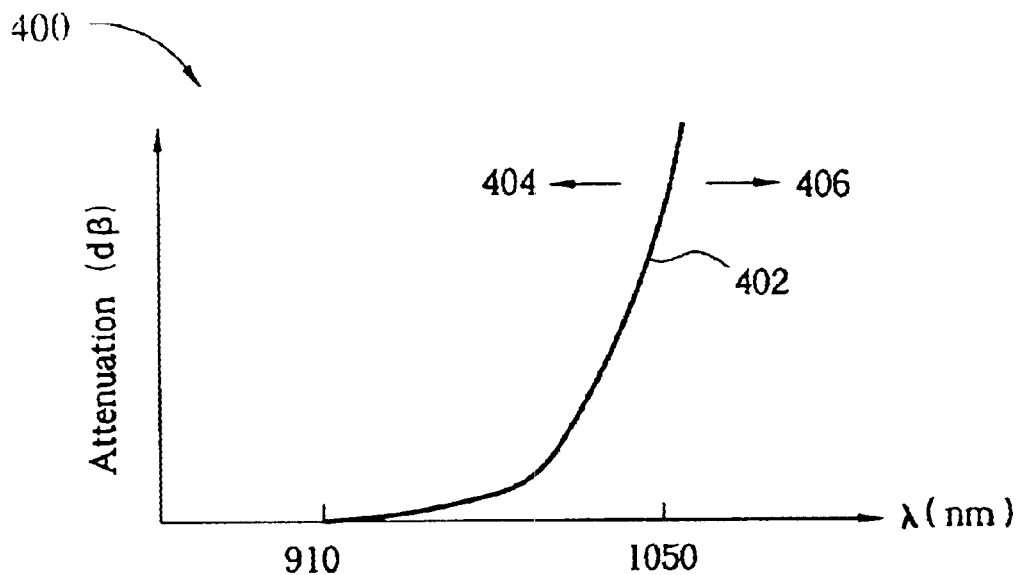
FIG. 4A depicts attenuation versus bend wavelength for a coiled fiber.
Figure 4B:
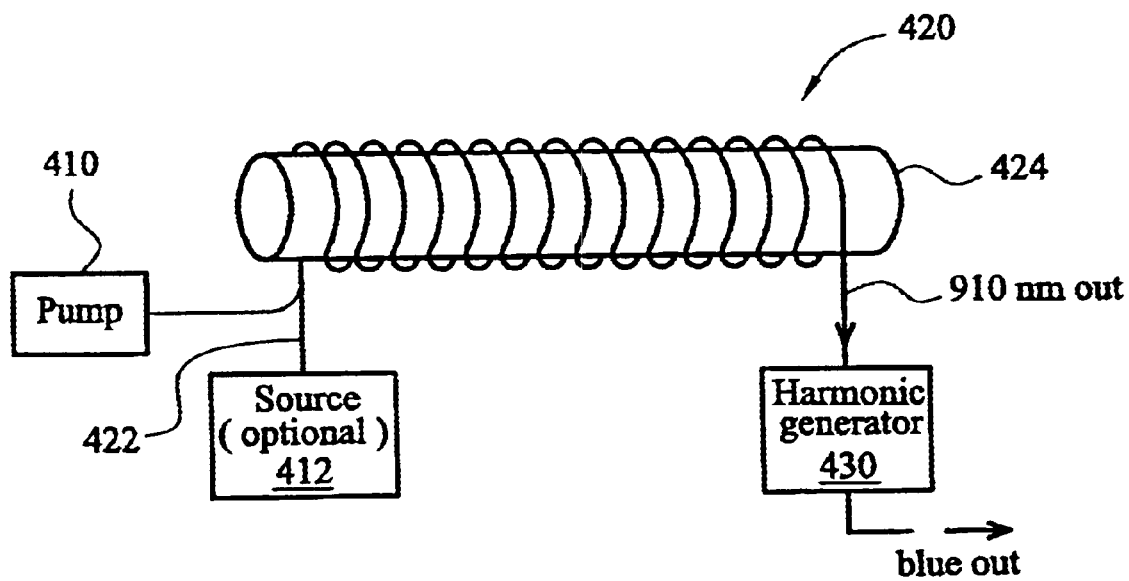
FIG. 4B depicts an embodiment of a blue laser source incorporating a coiled fiber to suppress gain at an undesired wavelength.

A second alternative method for suppressing undesired wavelengths is described with respect to FIGS. 4A–4B. The second alternative method relies on the fact that coiling a fiber produces wavelength dependent losses. FIG. 4A depicts a graph 400 of attenuation versus wavelength λ for a coiled fiber. Here attenuation is measured in dB. The attenuation rises abruptly as wavelength increases. The abrupt rise 402 in the attenuation curve effectively divides the wavelength axis into a weakly attenuated region 404 and a strongly attenuated region 406. It turns out that the location of the abrupt rise 402 and, hence, the boundary between the weakly and strongly attenuated regions depends on the bend radius of the coiled fiber. Therefore, by properly bending a coiled fiber, the fiber may attenuate undesired long wavelengths but not desired shorter wavelengths. For example, by appropriate choice of bend radius, a coiled fiber may be engineered to attenuate 1050 nm (i.e. 1.05 micron) radiation but not 910 nm (i.e. 0.91 micron) radiation.

FIG. 4B depicts an exemplary embodiment of a blue laser apparatus incorporating a coiled fiber to suppress optical gain at an undesired wavelength. The apparatus generally comprises a cladding-pumped fiber device 420. The fiber device 420 generally comprises an optical fiber 422 coiled around a mandrel of radius R. The radius of the mandrel 424 determines a bend radius of the fiber 422 for suppression of gain at an undesired wavelength, e.g. 1050 nm, as described above. For gain suppression in the infrared, R is typically of order 10 mm. Attenuation of radiation by bending optical fibers is discussed in detail by Sakai et al. in Applied Optics 17 (1978) p. 1499, which is incorporated herein by reference. A pump 410 provides pump radiation for the fiber device 420. The pump 410 is optically coupled to a cladding of the fiber 422 to provide pumping as described above with respect to FIG. 2B. An optional source 412 provides radiation to a core of the fiber 422. The fiber device 420 may be coupled to a harmonic generator 430 to produce blue radiation, e.g., by doubling 910 nm infrared radiation.

Both of the alternative methods for suppressing gain at an undesired wavelength rely on the fact the gain suppression effect occurs for wavelengths that are longer than the desired wavelength. Furthermore, those skilled in the art will recognize that it is possible to combine the tunnel cladding approach of FIGS. 3B–3C with the bending approach of FIG. 4 to provide a means for rejecting undesired wavelengths while retaining others.

Returning to FIG. 2A, the harmonic generator 220 typically comprises a non-linear crystal including a material such as Lithium Niobate ($LiNbO_3$), Lithium Tantalate ($LiTaO_3$), Lithium Borate ($LiBO_3$), Potassium Niobate, periodically poled lithium niobate (PPLN), periodically poled lithium tantalate (PPLT) MgO:PPLN, KTP, PPKTP, RTA, BBO, or PPRTA. The harmonic generator 220 may be a second-harmonic generator that interacts with two photons of the source radiation 201 to produce a single photon of output radiation 203. For example, if the source radiation 201 has a wavelength of 910 nm, the output radiation 203 will have a wavelength of 455 nm, which the eye senses as blue. For second-harmonic generation, a given piece of non-linear crystal has a characteristic frequency-doubling coefficient in units of % per Watt of input power. Generally, the higher the input power, the higher the conversion efficiency. The power of output radiation 203 goes as the square of the power of input source radiation 201 up to a point were the input is significantly depleted. The crystalline axes of the material comprising second-harmonic generator 220 must be in the right orientation, the crystal must be at the right temperature, the crystal must not damage under high input power. Other considerations constrain the choice of doubling crystals, however these are well known in the art. Those of skill in the art will recognize that non-linear crystals may also be used as third-harmonic generators to triple the frequency of source radiation 201, or as higher order harmonic generators.

There are a number of options and constraints when the fiber device 202 includes a fiber amplifier, such as fiber amplifier 210 and the amplifier is coupled to an oscillator, such as oscillator 230. One constraint is that the oscillator must provide source radiation 201 at the correct wavelength because the amplifier 210 generally does not shift wavelengths. Another constraint is that the average power of the radiation in the amplifier 210 is preferably on the order of 10 mW or greater so that the amplifier 210 operates stably and with low noise. Another constraint is that the oscillator must have a low enough duty cycle so that the peak power after amplification is high enough for efficient non-linear conversion in the harmonic generator 220. The oscillator 230 may be, for example, a short-pulse oscillator that produces infrared radiation at a wavelength near 0.91 microns for Neodymium-doped fiber amplifier 210 and a few milliwatts of power. Exemplary embodiments of oscillator 230 include pulsed, low-duty-cycle semiconductor lasers and mode-locked Nd:Glass or crystal lasers. Low duty cycle, short pulse (e.g. <100 ps) oscillators are typically used to provide sufficient peak power for existing harmonic generators.

One oscillator type is a mode-locked neodymium bulk crystalline or glass laser operating at the same transition as the Nd:Glass fiber 212. Mode-locked lasers can conveniently have a ratio of peak power to average power of 1000. Thus an amplified signal with a 1 Watt average power would have a 1 kilowatt peak power, which is adequate for efficient nonlinear conversion. Historically, mode-locked lasers have been difficult to maintain and operate. The typically require complex electronics and tight mechanical tolerances. Recently, it has become possible to make "passively mode-locked" lasers that are much simpler and more stable. Such "passively mode-locked" typically use Nd:YLF, Nd:Yttrium Vanadate, or Nd:Glass. Such a "passively mode-locked" laser may be used as oscillator 230.

Another possible type of device for oscillator 230 is a modulated semiconductor laser. Semiconductor lasers with a wavelength of 910 nm are available. Some of these lasers can be electrically pulsed to provide pulses as short as 100 psec ($10^{-10}$ sec), while maintaining an average power near 1 mW and peak power near 100 mW. Such a power level and duty cycle are approximately adequate for efficient conversion to blue light after amplification which would increase the average power to about 10 Watts and peak power to about 1 kW. Improvements in semiconductor laser technology may make this approach more competitive with mode-locked lasers.

It is also possible to use an externally modulated semiconductor laser as the oscillator 230. A semiconductor laser may be externally modulated using, for example, a waveguide modulator. Waveguide modulators may be faster than electrical pulsing of the semiconductor laser itself. Furthermore, waveguide modulators may provide better stability.

2. Three Color Light Source for Display

A blue laser of the type described above with respect to FIGS. 2A and 2B can be incorporated into a three-color light source according to a second embodiment of the present invention. Although the following description describes a specific embodiment that uses such a source to generate blue light, other blue laser sources may be used without loss of generality.

Figure 5:
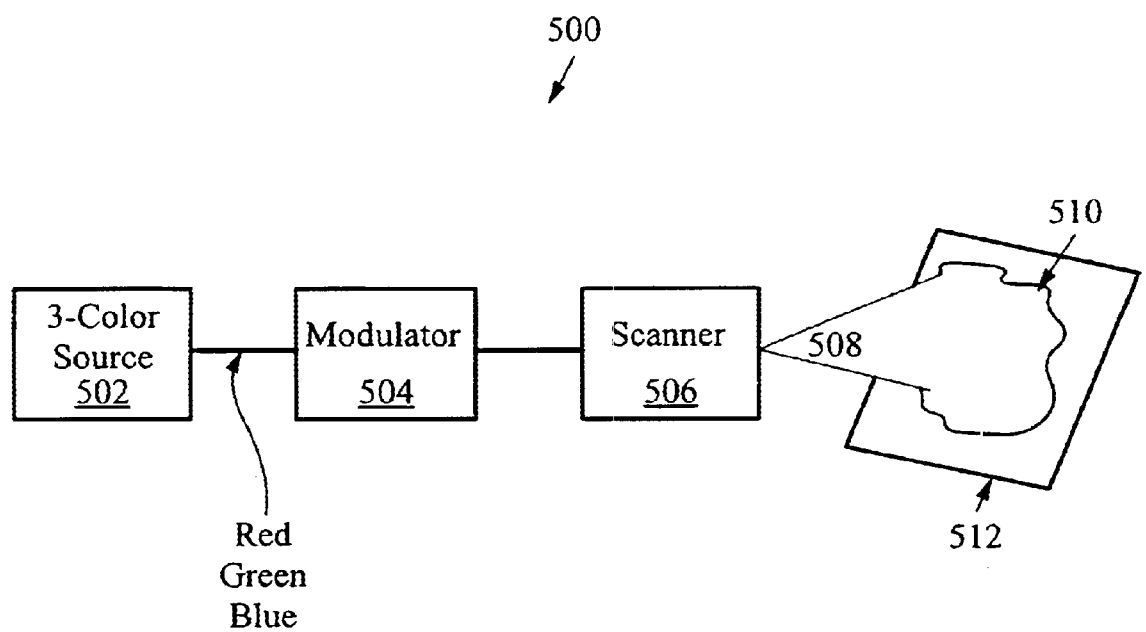
FIG. 5 depicts a simplified schematic diagram of a display system according to a fourth embodiment of the present invention.

FIG. 5 depicts a simplified schematic diagram of a display system 500 according to a fourth embodiment of the present invention. The system 500 generally comprises a three color source 502, and a scanning means 506 optically coupled to the source 502. The source 502 produces blue laser light as described above. The source 502 may produce green and red light by any suitable means. The source 502 may alternatively produce other color combinations of three or more colors, including blue.

The modulating means 504 modulates the intensities of the red, green, and blue light to produce different colors. For example, the light emerging from the source 502 may be split into three separate beams, each beam corresponding to a different color, through the use of-wavelength selective beam splitters. The generation of different colors by mixing of three or more primary colors is well known in the art. Each of the three beams may be separately modulated and then recombined to form an output beam 508.

The scanner 506 produces an image 510 from the modulated output beam 508. The scanner may be coupled to the source 502 or the modulator 504. The scanner may raster scan the output beam 508 across a screen 512 in two dimensions in a manner having features in common with conventional video image generation. In a raster-scanned system, the modulator 504 modulates the power of a beam of output radiation, and a hi-speed scanning system rasters the beam across a screen. Alternatively the scanner 506 may produce an image line-by-line. A line-by-line system, creates a whole "line" of the display at a time, by spreading the light over a linear array of modulators. This line is then scanned across the screen 512 in only one dimension.

It will be clear to one skilled in the art that the above embodiment may be altered in many ways without departing from the scope of the invention. Embodiments of the present invention that utilize fiber amplifiers can be much more efficient than competing techniques, since fiber amplifiers are very efficient. Temperature of pump diodes can be less critical since fiber amplifiers have loose tolerances on pump wavelength. The embodiments of the present invention can be implemented without water cooling since the more efficient system dissipates less heat and the tolerant pump wavelength specification generally requires less precise temperature control. Furthermore, fiber based systems can be made more compact since fiber can be wound up into a small volume.

Accordingly, the scope of the invention should be determined by the following claims and their legal equivalents.

What is claimed is:

1. An apparatus for producing blue light comprising:
   a) a neodymium-doped cladding-pumped fiber device for generating a radiation, the fiber device comprising a single mode core having a first refractive index $n_{core}$, a pump cladding region having a second refractive index $n_{c1}$, a tunnel cladding region having a third refractive index n' disposed between the single c1 mode core and the pump cladding region, and an outer cladding region, wherein:
      the fiber device has an average squared refractive index $<n^2(r)>$ that is less than $n_{c1}^2$, where n is refractive index and r is radial distance, and
      wherein in the fiber device undesired wavelengths have no bound mode and desired wavelengths of the radiation have a bound mode; and
   b) an optical harmonic generator optically coupled to the fiber device for increasing a frequency of a desired wavelength of the radiation to produce the blue light.

2. The apparatus of claim 1, wherein the undesired wavelength is about 1.05 microns.

3. The apparatus of claim 1, wherein the desired wavelength is about 0.91 microns.

4. The apparatus of claim 1, wherein the third refractive index is less than the first and second refractive indexes.

5. The apparatus of claim 1, wherein the single mode core is surrounded by the tunnel cladding region, which is surrounded by the pump cladding region, which is surrounded by the outer cladding region.

6. The apparatus of claim 5, wherein the outer cladding region is characterized by a fourth refractive index that is less than the second refractive index.

7. The apparatus of claim 1 wherein the harmonic generator includes a material chosen from the group consisting of Lithium Niobate ($LiNbO_3$), Lithium Tantalate ($LiTaO_3$), Lithium Borate ($LiBO_3$), Potassium Niobate, periodically poled lithium niobate (PPLN), periodically poled lithium tantalate (PPLT) MgO:PPLN, KTP, PPKTP, RTA, BBO, and PPRTA.

8. The apparatus of claim 1, further comprising:
   c) a first pump source, optically coupled to the fiber device at a first end thereof.

9. The apparatus of claim 8, wherein the pump source has an intensity of about 100 W/mm$^2$ or greater at an entrance to the fiber device.

10. The apparatus of claim 8, further comprising means for retroreflecting pumping radiation at a second end of the fiber device back toward the first end.

11. The apparatus of claim 8, further comprising a second pump source coupled to the fiber device at a second end thereof.

12. The apparatus of claim 1, wherein the apparatus produces blue output radiation at a power greater than or equal to about 1 watt.

13. An image display apparatus comprising:
   a) means for producing a blue light comprising:
      a neodymium-doped cladding-pumped fiber device for generating a radiation, the fiber device comprising a single mode core having a first refractive index $n_{core}$, a pump cladding region having a second refractive index $n_{c1}$, a tunnel cladding region having-a third refractive index n' disposed between the single mode core and the pump cladding region, and an outer cladding region, wherein:
         the fiber device has an average squared refractive index $<n^2(r)>$ that is less than $n_{c1}^2$ and where n is refractive index and r is radial distance,
         wherein in the fiber device undesired wavelengths have no bound mode and desired wavelengths of the radiation have a bound mode; and
      an optical harmonic generator optically coupled to the fiber device for increasing a frequency of a desired wavelength of the radiation to produce the blue light;
   b) means for producing green light and red light;
   c) means for modulating intensities of the red, green and blue light; and
   d) means for scanning the red, green and blue light to form an image.

14. A method for producing blue light comprising:
   a) producing infrared light with a neodymium-doped cladding-pumped fiber device, the fiber device comprising a single mode core having a first refractive index $n_{core}$, a pump cladding region having a second refractive index $n_{c1}$, a tunnel cladding region having a third refractive index n' disposed between the single mode core and the pump cladding region, and an outer cladding region, wherein:

the fiber device has an average squared refractive index $<n^2(r)>$ that is less than $n_{c12}$, and in the fiber device undesired wavelengths have no bound mode and desired wavelengths of the infrared light have a bound mode; and b) doubling a frequency of a desired wavelength of the infrared light to produce the blue light.

* * * * *